US005828295A

United States Patent [19]

Mittel et al.

[11] Patent Number: 5,828,295

[45] Date of Patent: Oct. 27, 1998

[54] MODE TRACKING TRANSDUCER DRIVER FOR A NON-LINEAR TRANSDUCER

[75] Inventors: James Gregory Mittel, Boynton Beach; John M. McKee, Hillsboro Beach; Darrell Curtis Weber, Boynton Beach, all of Fla.

[73] Assignee: Motorola, Inc., Schaumburg, Ill.

[21] Appl. No.: 707,543

[22] Filed: Sep. 4, 1996

[51] Int. Cl.[6] .................................. H04B 3/36; H04Q 1/30

[52] U.S. Cl. ...................................... 340/407.1; 340/311.1; 340/825.46; 310/316

[58] Field of Search .......................... 340/825.46, 825.44, 340/407.1, 311.1; 310/316, 318, 311; 367/140; 331/4, 316

[56] References Cited

U.S. PATENT DOCUMENTS

| | | | |
|---|---|---|---|
| 4,275,363 | 6/1981 | Mishiro et al. | 331/4 |
| 4,724,401 | 2/1988 | Hogge, Jr. et al. | 331/4 |
| 4,754,186 | 6/1988 | Choperena et al. | 310/316 |
| 4,965,532 | 10/1990 | Tomoshisa | 331/4 |
| 5,107,540 | 4/1992 | Mooney et al. | 381/192 |
| 5,113,116 | 5/1992 | Wilson | 310/316 |
| 5,216,338 | 6/1993 | Wilson | 318/116 |
| 5,327,120 | 7/1994 | McKee et al. | 340/825.46 |
| 5,649,020 | 7/1997 | McClurg et al. | 340/311.1 |

OTHER PUBLICATIONS

U.S. Patent Application Serial No. 08/506,304 filed Jul. 24, 1955 by McClurg, et al. entitled "Electronic Driver for an Electromagnetic Resonant Transducer" US: 5,649,020.

U.S. Paten Application Serial No. 08/657,126 filed Jun. 3, 1996 by McKee, entitled "Non–Linear Reciprocationg Device" US: 5,650,763.

Jacobsen and Ayre, *Engineering Vibrations*, McGraw–Hill Series in Mechanican Engineering, New York City, 1958, pp. 286–290.

*Primary Examiner*—Brent A. Swarthout
*Assistant Examiner*—Van T. Trieu
*Attorney, Agent, or Firm*—Philip P. Macnak

[57] ABSTRACT

A mode tracking transducer driver (100) for a non-linear electromagnetic transducer (102) includes a voltage controlled oscillator (104) coupled within a phase lock loop to a transducer driver (106) and a mode detector (112, 108). The voltage controlled oscillator (104) generates a variable frequency output signal, and is responsive to a frequency control signal for controlling the frequency of the output signal. The transducer driver (106) generates a transducer drive signal (502) which is coupled to the non-linear electromagnetic transducer (102) to generate a tactile alert. The mode detector (112, 108) detects a mode change between at least the first operating mode and the second operating mode of the non-linear electromagnetic transducer (102), and in response thereto generates the frequency control signal (118) which establishes a quasi-resonant frequency (204) at which the tactile energy delivered by the non-linear electromagnetic transducer (102) is maximized.

15 Claims, 5 Drawing Sheets

MODE TRACKING TRANSDUCER DRIVER FOR A NON-LINEAR TRANSDUCER

BACKGROUND OF THE INVENTION

1. Field of the Invention

This invention relates in general to transducer drivers for electromagnetic transducers, and more specifically to a frequency tracking transducer driver for a non-linear electromagnetic transducer.

2. Background of the Invention

Historically, a radial asymmetrically loaded motor has been used to provide a silent, or tactile alert for portable electronic devices, such as PDA's and portable communication devices, such as pagers and cellular telephones. Motors are not designed to be asymmetrically loaded, and as a result, wear of the shaft and bearing sleeve over time is inevitable leading to motor failure. Motors require extremely high start-up currents, typically in excess of 100 milliamperes; and high operating currents, typically in excess of 50 milliamperes, both of which lead to significant reduction in battery life. Motors are not suitable for reflow soldering together with the other electronic components of the electronic device, as the reflow soldering temperatures would destroy the lubrication provided for the spinning shaft. Motors also are a common source of desense when used in portable communication devices due to the commutating nature of the motor where spark gap EMF phenomena is common.

A new generation of non-rotational, non-linear electromagnetic transducers were described by Mooney et al., U.S. Pat. No. 5,107,540, and McKee et al., U.S. Pat. No. 5,327,120, both of which significantly reduced the energy consumed from a battery for operation as a tactile alerting device. Start up currents averaging only 40 milliamperes and operating currents of only 10 milliamperes are typical for these transducers. The transducers are not subject to mechanical failures due to wear, are reflow solderable, and have no commutating elements which generate radio desense. In addition, these non-linear transducers operated at sub-audible frequencies which maximize the tactile sensation developed when the non-linear transducer is coupled to a person, resulting in a truly silent non-disruptive alert.

The major issue with implementing the non-linear transducers lies in their electrical drive requirements. Unlike the motor which can be simply switched on and off, the non-linear transducers require a complex electrical drive circuit to optimize their tactile energy output. A number of transducer driver circuits suitable for use with the non-linear transducers are described in U.S. patent application Ser. No. 08/506,304 filed Jul. 24, 1995 by McClurg et al entitled “Electronic Driver for an Electromagnetic Resonant Transducer” which is assigned to the Assignee of the present invention. Tactile energy output from these non-linear transducer driver circuits was optimized by monitoring a level of tactile energy actually being generated by the non-linear transducer during operation.

In those instances where commutating noise was not an issue, an improved non-linear transducer which could be driven directly from a battery was described in U.S. patent application Ser. No. 08/657126 filed Jun. 3, 1996 by McKee et al, entitled “Non-linear Reciprocating Device” which is assigned to the assignee of the present invention. The non-linear reciprocating device utilized non-linear contactors for operation which maximized the tactile energy delivered in either a single battery or dual battery configuration.

While the transducer driver circuits described above have optimized the tactile energy delivered from non-linear transducers, there is a need for a transducer driver circuit which can track the operating modes of the non-linear electromagnetic transducers to provide a quasi-resonant operation for enhanced tactile energy output.

SUMMARY OF THE INVENTION

In accordance with one aspect of the present invention, a mode tracking transducer driver for a non-linear electromagnetic transducer having at least a first operating mode and a second operating mode includes a voltage controlled oscillator, a transducer driver and a non-linear electromagnetic transducer; and a mode detector. The voltage controlled oscillator generates an output signal having a variable frequency, and is responsive to a frequency control signal for controlling a frequency of the output signal. The transducer driver has an input coupled to the voltage controlled oscillator and generates a transducer drive signal which is coupled to a non-linear electromagnetic transducer. The mode detector is coupled to the transducer driver and detects a mode change between at least the first operating mode and the second operating mode of the non-linear electromagnetic transducer. The mode detector generates the frequency control signal which establishes a quasi-resonant operating frequency at which a tactile energy output of the non-linear electromagnetic transducer is maximized.

In accordance with a second aspect of the present invention, a phase locked, mode tracking transducer driver for a non-linear electromagnetic transducer having at least a first operating mode and a second operating mode includes a voltage controlled oscillator, a transducer driver, and a phase comparator. The voltage controlled oscillator generates an output signal having a variable frequency. The voltage controlled oscillator is responsive to a frequency control signal for controlling a frequency of the output signal. The transducer driver has an input coupled to the voltage controlled oscillator and generates an transducer drive signal which is coupled to a non-linear electromagnetic transducer. The phase comparator has a first input coupled to the transducer driver, and a second input coupled to the voltage controlled oscillator and detects a phase change representative of a mode change between at least the first operating mode and the second operating mode of the non-linear electromagnetic transducer. The phase detector generates the frequency control signal which establishes a quasi-resonant operating frequency at which the tactile energy output of the non-linear electromagnetic transducer is maximized.

DESCRIPTION OF THE PREFERRED EMBODIMENTS

Figure 1:
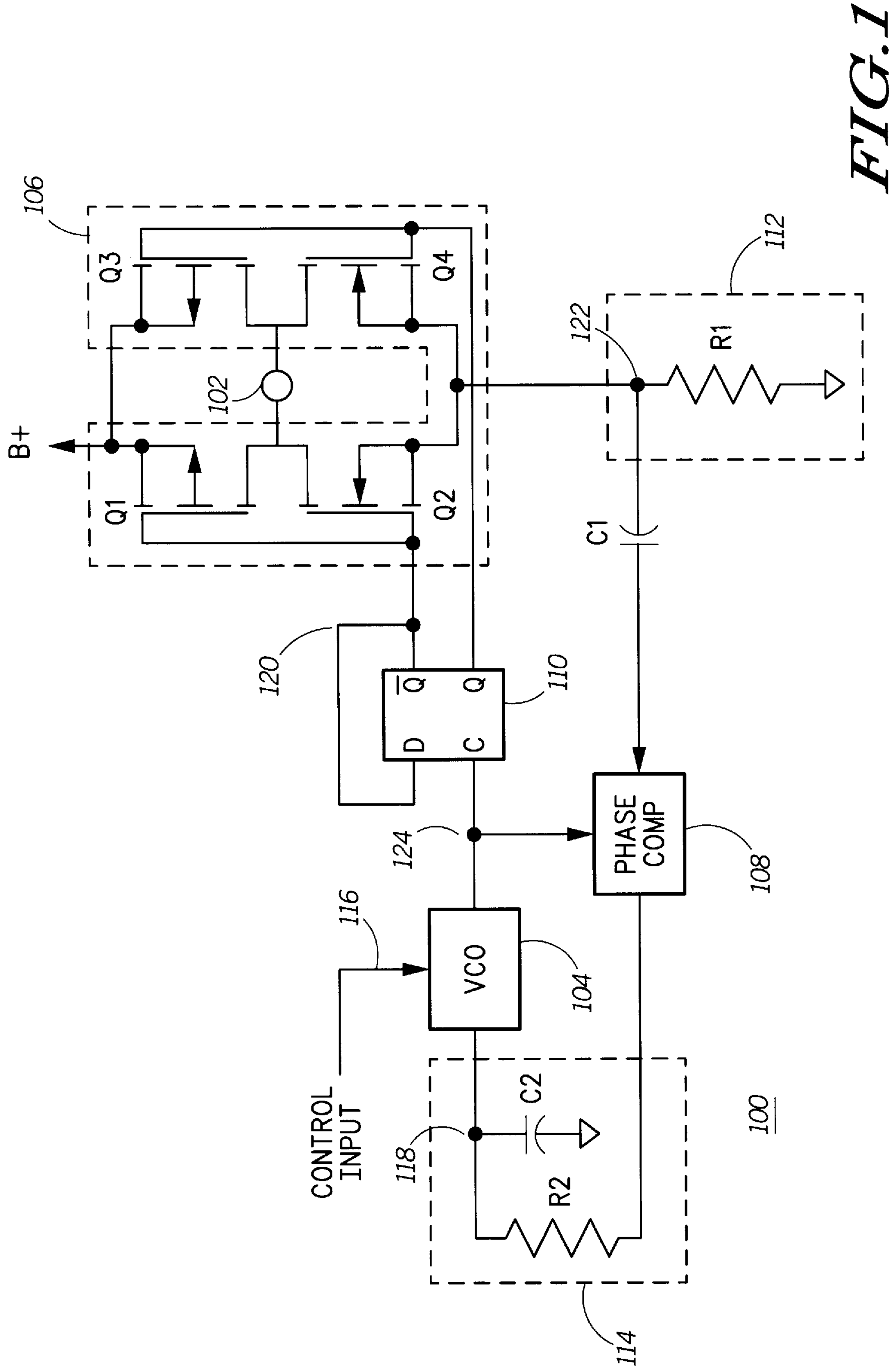
FIG. 1 is an electrical schematic diagram of a mode tracking transducer driver in accordance with the present invention.

FIG. 1 is an electrical block diagram of a mode tracking transducer driver 100 in accordance with the present invention. The mode tracking transducer driver 100 includes a voltage controlled oscillator 104 (hereinafter referred to as a VCO), a transducer driver 106, a phase comparator 108, a D flip-flop 110, a mode detector 112, and a low pass filter 114. The VCO 104 operates in a manner well known to one of ordinary skill in the art, whereby a frequency control signal generated at the output of the low pass filter 114 controls the generation of a variable frequency output signal which varies over a predetermined frequency range which by way of example is from 40 Hertz to 120 Hertz when utilized to drive a tactile alerting device, such as the non-linear electromagnetic transducer 102. For a tactile alerting device, the optimum frequency of operation is from 90 Hertz to 100 Hertz. A control input 116 is provided which is used to enable operation of the VCO 104 when an operation of the non-linear electromagnetic transducer 102 (hereinafter referred to as a transducer) is required, such as when the transducer 102 is utilized to generate a tactile alert when utilized in an electronic device, such as a pager or portable cellular telephone. The variable frequency output of the VCO 104 is coupled to a clock input of the D flip-flop 110 and to a first input of the phase comparator 108. The D flip-flop 110 operates as a frequency divider providing a predetermined division value of two.

The transducer driver 106 includes a P-channel MOSFET Q1 coupled to an N channel MOSFET Q2 forming one half of a bridge driver circuit, and a P-channel MOSFET Q3 coupled to an N channel MOSFET Q4 forming the other half of the bridge driver circuit, the P-channel MOSFET transistors being connected in series with the N-channel MOSFET transistors. The source electrodes of the P-channel MOSFET transistors Q1 and Q3 couple to a supply voltage B+, which by way of example is 1.5 volts. The source electrodes of the N-channel MOSFET transistors Q2 and Q4 are connected together and couple to a first terminal of resistor R1. The second terminal of resistor R1 is coupled to ground. The bridge driver outputs, at the connection of the P-channel and N-channel MOSFET transistors, are coupled to the transducer 102, and provide a transducer drive signal to energize the transducer 102. The gate electrodes of MOSFET transistors Q1 and Q2 are coupled to the Q-bar output of the D flip-flop 110, and the gate electrodes of MOSFET transistors Q3 and Q4 are coupled to the Q output of the D flip-flop 110.

The resistor R1 functions as a mode sensing element within the mode detector 112, and is used to sense a mode change between at least a first operating mode of the transducer 102 and a second operating mode of the transducer 102, as will be described in further detail below. The first terminal of resistor R1 also couples to a first terminal of a capacitor C1, and the second terminal of capacitor C1 couples to a second input of the phase comparator 108. Capacitor C1 provides direct current isolation between the bridge drive 106 and the input of the phase comparator 108. The output of the phase comparator 108 couples to the input of the low pass filter 114, which in the preferred embodiment of the present invention is configured as a conventional RC filter section comprising a resistor R2 and a capacitor C2. The output of the low pass filter 114 couples to the input of the VCO 104. It will be appreciated from the description provided above, that the mode tracking transducer driver circuit is interconnected as a phase lock loop controller. The phase lock loop controller is utilized to generate a frequency control signal for establishing a quasi-resonant operating frequency at which the tactile energy output of the non-linear electromagnetic transducer 102 is maximized, as will be described in further detail below.

By way of example, the MOSFET transistors can be implemented using enhancement mode MOSFET transistors, such as the Si6552DQ Dual Enhancement Mode MOSFET transistors manufactured by Siliconix of Santa Clara, Calif.; the D flip-flop 110 can be implemented using an MC74HC74A Dual Flip-Flop integrated circuit with Set and Reset, the Set and Reset inputs being disabled by being coupled to B+ (not shown schematically); and the phase comparator 108 and VCO 104 can be implemented with an MC74HC4046A Phase Lock Loop integrated circuit. The MC74H series integrated circuits are manufactured by Motorola Inc. of Schaumburg, Ill. It will be appreciated that the phase lock loop and bridge driver circuits can also be integrated into a single integrated circuit, thereby reducing the component count, complexity and cost of the mode tracking driver 100.

Figure 2:
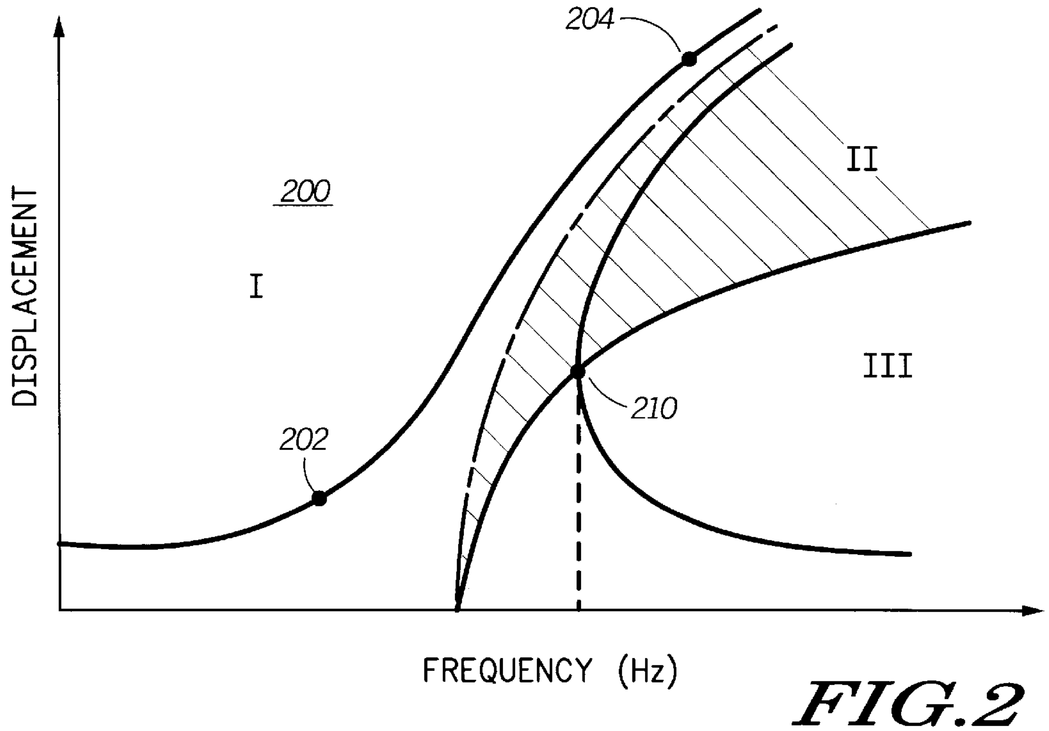
FIG. 2 is a graph depicting the impulse output and quasi-resonant frequency of a non-linear electromagnetic transducer in accordance with the present invention.

The operation of the mode tracking transducer driver 100 is best understood by referring to FIG. 2 which is a graph depicting the impulse output of the non-linear electromagnetic transducer 102, examples of which are described in U.S. Pat. No. 5,107,540 to Mooney et al., and U.S. Pat. No. 5,327,120 to McKee et al. The non-linear electromagnetic transducer 102 utilizes a hardening spring system, the operation of which is defined by the well known Duffing Equation which is described on pages 286–290 in the book "Engineering Vibrations" by Jacobsen and Ayre published in 1958 by McGraw-Hill Book Company of New York City.

The non-linear electromagnetic transducer 102 normally operates in domain I, starting at a lower frequency 202 which is generated by the VCO 104 when initially enabled by the control input 116. The VCO 104 output is then swept, or ramped, up in frequency to an upper frequency 204, the rate at which the VCO 104 output is ramped up being a function of the phase error detected between the VCO output, the mode signal 122 developed across R1, and the low pass filter 114. The mode signal 122 is a measure of the phase of the transducer drive current relative to the drive voltage applied to the transducer 102 as will become more clear in the description to follow.

As can be observed from FIG. 2, as the frequency of the bridge drive signal coupled to the transducer 102 is increased, the displacement of the motional mass (described in Mooney et al. and McKee et al.) of the transducer 102 increases, thereby increasing the level of tactile energy being generated by the transducer 102. As the VCO output approaches the upper frequency 204, which is defined herein as the quasi-resonant frequency of the transducer 102, the transducer 102 becomes conditionally unstable and "jumps" out of domain I and into domain II. The "jump" from domain I to domain II is sensed as a mode change from at least a first operating mode of the transducer 102 to a second operating mode of the transducer 102.

In the prior art transducer driver circuits for a non-linear electromagnetic transducer, the "jump" to domain II did not in actuality occur, but rather the "jump" would be directly into domain III, defined as a tactile level energy output generated above a frequency 210, where stable operation of the transducer 102 occurs. The prior art transducer driver circuits were incapable of tracking the "jump" into domain II as the mode tracking transducer driver 100 in accordance with the present invention, because the prior art transducer driver circuits typically were capable of only periodically sweeping the transducer drive frequency up to and very often through the frequency at which "jump" occurs, or limited the upper operating frequency which was generated to a frequency below the frequency at which the "jump" occurred. Such operation, thus, while providing a high level tactile energy output never completely maximized the tactile energy which can be delivered by the non-linear electromagnetic transducer.

The mode tracking transducer driver 100 in accordance with the present invention maximizes the tactile energy output by sensing the mode change which occurs when the transducer 102 "jumps" from domain I to domain II, and then substantially instantaneously reducing the bridge transducer drive signal frequency to a frequency just below the "jump" frequency. Since the motion of the motional mass of the transducer 102 cannot instantaneously drop to the lower level defined in domain III due to the energy already stored within the motional mass, the near instantaneous reduction in frequency enables the transducer 102 to resume operation in domain I, which results in the generation of a quasi-resonant frequency as described above.

Figure 5:
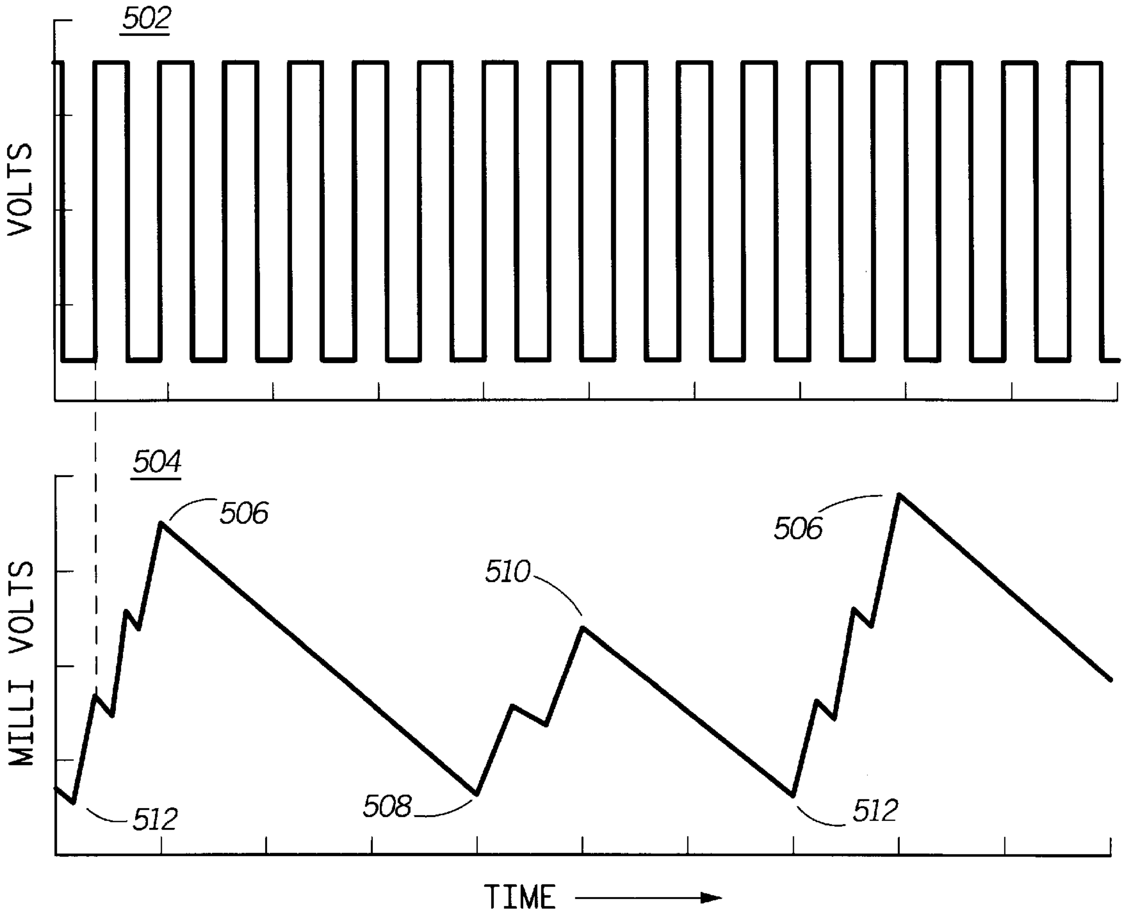
FIG. 5 is a diagram illustrating typical electrical signals generated by the mode tracking transducer driver when operating at the quasi-resonant frequency in accordance with the present invention.
Figure 3:
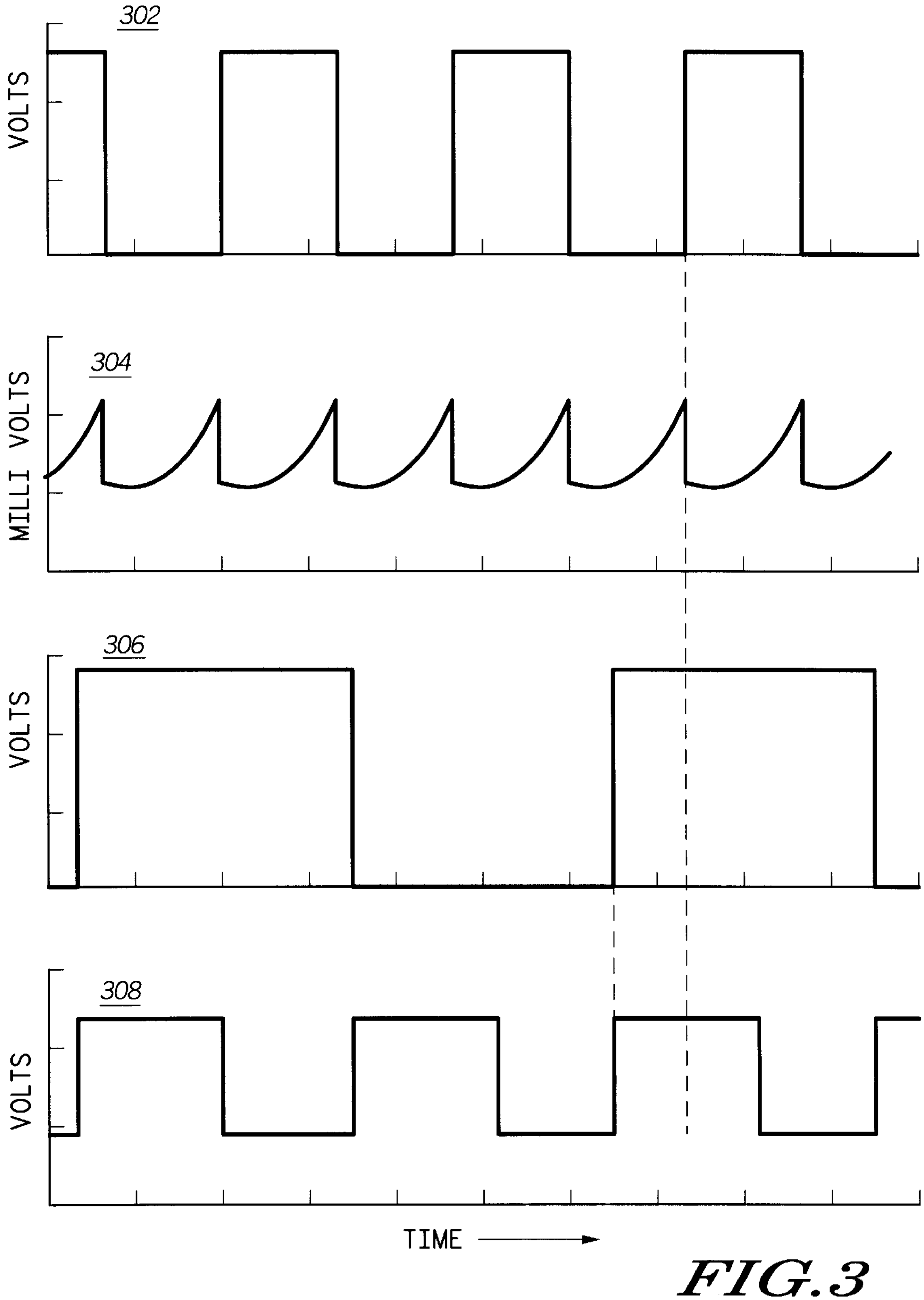
FIG. 3 is a diagram illustrating typical electrical signals generated by the mode tracking transducer driver when operating below the quasi-resonant frequency of the non-linear electromagnetic transducer in accordance with the present invention.
Figure 4:
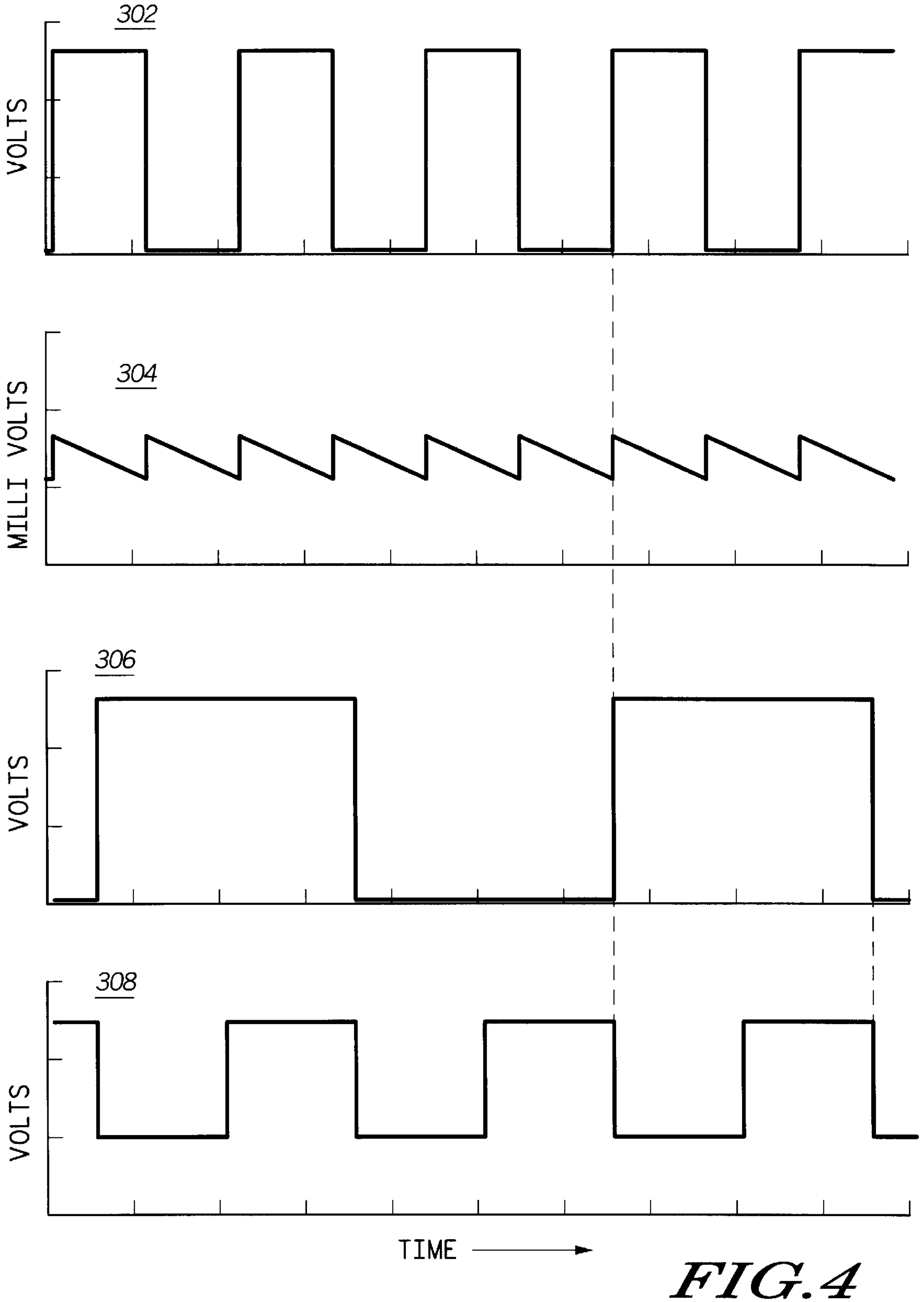
FIG. 4 is a diagram illustrating typical electrical signals generated by the mode tracking transducer driver when operating above the quasi-resonant frequency in accordance with the present invention.

The operation of the mode tracking transducer driver 100 is best understood by referring to FIGS. 3 through 5. FIG. 3 is a diagram illustrating typical electrical signals generated by the mode tracking transducer driver 100 at the frequency just below the quasi-resonant frequency 204. The VCO output is shown as a signal 302, also referred to as the VCO output signal 124, the mode signal is shown as a signal 304, also referred to as the mode signal 122, the input to the transducer driver 106 is shown as a signal 306, also referred to as the transducer drive signal 120, and the mode signal 122 after being limited through amplification within the phase comparator 108 is shown as a signal 308, also referred to as the limited mode signal 308. As shown in FIG. 3, signal 302 which is the VCO output signal 124 is generated at a frequency twice the transducer drive signal 120 shown as signal 306. The phase comparator 108 compares signal 308, the limited mode signal, with signal 302, the VCO output signal 124, to generate the frequency control signal 118. The transducer driver 106 doubles the actual transducer drive signal 306, and consequently the divider is used to divide the VCO output signal 124 prior to driving the transducer 102 so as to obtain two signals at the same frequency which are then compared in phase.

FIG. 4 is a diagram illustrating typical electrical signals generated by the mode tracking transducer driver 100 when operating above the quasi-resonant frequency 204, i.e. after the transducer 102 has "jumped" into domain II. The VCO output signal 124 is again shown as signal 302, the mode signal 122 as signal 304, the transducer drive signal 120 as signal 306, and the mode signal 122 limited within the phase comparator 108 as signal 308. It should be noted that the phase of the limited mode signal 308 of FIG. 4 representing a second operating mode of the transducer 102 in domain II is 180° out of phase to the limited mode signal 308 of FIG. 3 representing a first operating mode of the transducer 102 operating in domain I, thereby providing a clear indication of the mode change occurring within the transducer 102.

FIG. 5 is a diagram illustrating typical electrical signals generated by the mode tracking transducer driver 100 when operating at the quasi-resonant frequency 204. The signal 502 is the transducer drive signal 120 which is used to drive the transducer 102. The signal 504 is the frequency control signal 118 which is generated at the output of the low pass filter 114. As can be seen from FIG. 5, when the VCO output frequency is below the upper frequency 204, the phase lock loop continuously increases the frequency toward the upper frequency 204. When the upper frequency 204 is reached at point 506, the mode of the transducer 102 changes from domain I to domain II. The phase lock loop then gradually reduces the VCO output frequency to point 508, at which time the mode of operation of the transducer 102 has again returned to domain I. The VCO output frequency again begins to increase to point 510, wherein the cycle repeats as the VCO output frequency drops to point 512. In the example shown in FIGS. 3 through 5, the actual frequency variation which occurs is approximately 98 Hz±2 Hz which defines the quasi-resonant frequency 204.

Figure 6:
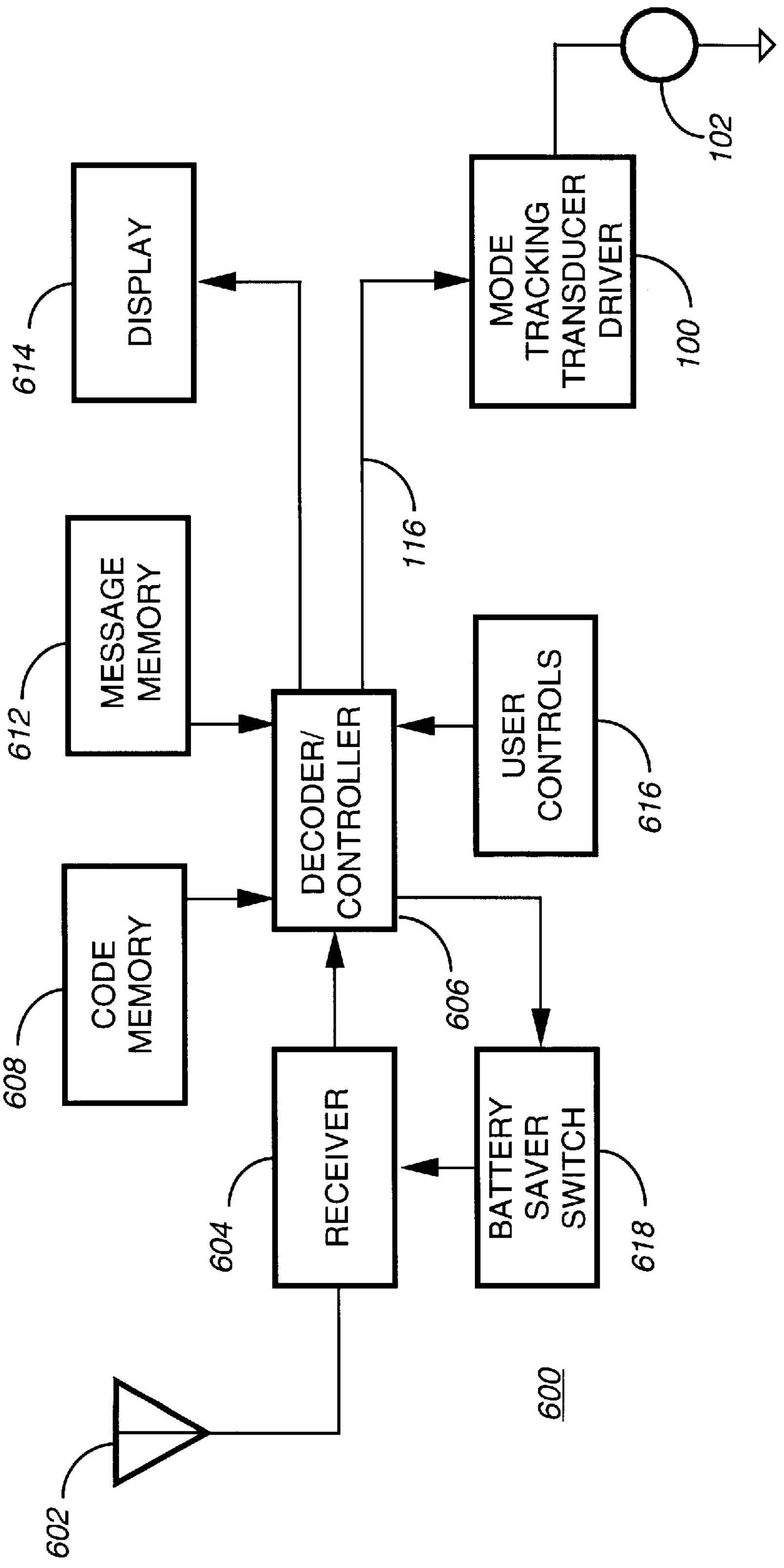
FIG. 6 is an electrical block diagram of a communication device utilizing the mode tracking transducer driver in accordance with the present invention.

FIG. 6 is an electrical block diagram of a communication device 600, such as a selective call receiver, utilizing the mode tracking transducer driver in accordance with the present invention. Radio frequency signals which can include selective call messages are intercepted by an antenna 602 which is coupled to the input of a receiver 604 which processes the intercepted radio frequency signals, in a manner well known to one of ordinary skill in the art. When the intercepted radio frequency signals include selective call messages, at least a portion of the selective call messages, such as the address portion, is decoded by the decoder. The received addresses are coupled to a decoder/controller 606 which compares the received addresses with a predetermined address which is stored within the code memory 608. When the received addresses match the predetermined address stored, any messages directed to the communication receiver 600 are received, and the messages are stored in a message memory 612. The decoder/controller 606 also generates an alert enable signal which is coupled to the control input 116 of the mode tracking transducer driver 100, described above, resulting in a tactile alert being generated by the non-linear electromagnetic transducer 102 indicating that a message has been received. The tactile alert is reset by the communication device user and the message is recalled from the message memory 612 for presentation of the message on the display 614 using user controls 616 which provide a variety of user input functions which are well known to one of ordinary skill in the art. The message recalled from the message memory 612 is directed via the decoder/controller 606 to a display 614, such as an LCD display.

In summary, a mode tracking transducer driver 100 has been described above which utilizes a phase lock loop to generate a VCO output signal which is twice the frequency of the transducer drive signal. The phase comparator 108 within the phase lock loop compares the VCO output signal with a mode signal which is representative of the mode of operation of the transducer 102. With the use of a phase lock loop as described above, the transducer 102 can be operated at a quasi-resonant frequency 204. The quasi-resonant frequency is a function of the non-linear electromagnetic transducer 102 being driven by the mode tracking transducer driver 100, and therefor the mode tracking transducer driver 100 in accordance with the present invention can maintain operation of the transducer 102 about the "jump" frequency, thereby maximizing the tactile energy output being delivered by the non-linear electromagnetic transducer 102. The mode tracking transducer driver enables the transducer 102 to be driven from a single cell battery and can therefore be used in a variety of battery powered electronic devices, such as battery powered communication device including paging receivers and portable cellular telephones.

We claim:

1. A mode tracking transducer driver for a non-linear electromagnetic transducer having at least a first operating mode and a second operating mode, said transducer driver comprising:

a voltage controlled oscillator, for generating an output signal having a variable frequency, said voltage controlled oscillator having an input responsive to a frequency control signal for controlling a frequency of the output signal;

a divider for dividing the output signal by a predetermined division value to generate a transducer drive signal;

a transducer driver, having an input coupled to said divider for driving the non-linear electromagnetic transducer continuously with the transducer drive signal; and a mode detector, coupled to said transducer driver, for detecting a mode signal indicating a mode change between at least the first operating mode and the second operating mode of the non-linear electromagnetic transducer, the mode signal being generated at a multiple of the transducer drive signal at a value equal to the predetermined division value, said mode detector including a phase comparator, responsive to the mode signal for generating the frequency control signal for establishing a quasi-resonant operating frequency at which a tactile energy output of the non-linear electromagnetic transducer is maximized.

2. The mode tracking transducer driver according to claim 1, wherein the output signal varies over a predetermined frequency range, and wherein the frequency control signal controls the frequency of the output signal within the predetermined frequency range.

3. The mode tracking transducer driver according to claim 2, wherein the predetermined frequency range is from 40 Hertz to 120 Hertz.

4. The mode tracking transducer driver according to claim 1, wherein said transducer driver is a configured as a bridge driver circuit.

5. The mode tracking transducer driver according to claim 1, wherein said mode detector comprises:

a mode sensing element, coupled to said transducer driver, for sensing the mode signal which depicts an operating mode of the non-linear electromagnetic transducer;

wherein said phase comparator is coupled to said mode sensing element and to said voltage controlled oscillator, and responsive to the a phase difference between the mode signal and the output signal, for generating the frequency control signal.

6. The mode tracking transducer driver according to claim 1, wherein the predetermined division value is two.

7. The mode tracking transducer driver according to claim 1, wherein said voltage controlled oscillator further includes a control input for enabling operation of said voltage controlled oscillator.

8. A phase locked, mode tracking transducer driver for a non-linear electromagnetic transducer having at least a first operating mode and a second operating mode, said transducer driver comprising:

a voltage controlled oscillator, for generating an output signal having a variable frequency, said voltage controlled oscillator having an input responsive to a frequency control signal for controlling a frequency of the output signal;

a divider for dividing the output signal by a predetermined division value to generate a transducer drive signal;

a transducer driver, having an input coupled to said divider for driving the non-linear electromagnetic transducer continuously with the transducer drive signal;

a mode sensing element, coupled to said transducer driver, for sensing a mode signal which depicts an operating mode of the non-linear electromagnetic transducer; and a phase comparator having a first input coupled to said voltage controlled oscillator, and a second input coupled to said mode sensing element, for detecting a phase difference between the output signal generated by said voltage controlled oscillator and the mode signal generated by said mode sensing element, for generating the frequency control signal for establishing a quasi-resonant operating frequency at which a tactile energy output of the non-linear electromagnetic transducer is maximized.

9. The phase locked, mode tracking transducer driver according to claim 8, wherein the mode signal is representative of a mode change between at least the first operating mode and the second operating mode of the non-linear electromagnetic transducer.

10. The phase locked, mode tracking transducer driver according to claim 8, further comprising a low pass filter coupled between said phase comparator and said voltage controlled oscillator, for generating the frequency control signal.

11. The phase locked, mode tracking transducer driver according to claim 8, wherein the predetermined division value is two.

12. The phase locked, mode tracking transducer driver according to claim 8, wherein said voltage controlled oscillator further includes a control input for disabling operation of said voltage controlled oscillator.

13. The phase locked, mode tracking transducer driver according to claim 8, wherein the output signal varies over a predetermined frequency range, and wherein the frequency control signal controls the frequency of the output signal within the predetermined frequency range.

14. The phase locked, mode tracking transducer driver according to claim 13, wherein the predetermined frequency range is from 40 Hertz to 120 Hertz.

15. The phase locked, mode tracking transducer driver according to claim 8, wherein said transducer driver is a configured as a bridge driver circuit.

* * * * *